(12) United States Patent
Chauncey et al.

(10) Patent No.: US 6,463,089 B1
(45) Date of Patent: Oct. 8, 2002

(54) HYBRID SPREAD SPECTRUM METHOD AND SYSTEM FOR WIRELESSLY TRANSMITTING AND RECEIVING WIDEBAND DIGITAL DATA

(75) Inventors: David C. Chauncey, Alden; James R. Doane, Grand Island; Christopher P. Hoen, Hamburg, all of NY (US)

(73) Assignee: Interair Wireless, Inc., Buffalo, NY (US)

( * ) Notice: Subject to any disclaimer, the term of this patent is extended or adjusted under 35 U.S.C. 154(b) by 0 days.

(21) Appl. No.: 09/136,247

(22) Filed: Aug. 19, 1998

(51) Int. Cl.[7] .................................................. H04B 1/69
(52) U.S. Cl. ........................................ 375/131; 375/132
(58) Field of Search .................................. 375/130, 131, 375/132, 140, 146

(56) References Cited

U.S. PATENT DOCUMENTS

| | | |
|---|---|---|
| 3,843,922 A | 10/1974 | Mead |
| 4,115,778 A | 9/1978 | Snow |
| 4,823,386 A | 4/1989 | Dumbauld et al. |
| 5,381,346 A | 1/1995 | Monahan-Mitchell |
| 5,459,474 A | 10/1995 | Mattioli et al. |
| 5,490,275 A | 2/1996 | Sandvos et al. |
| 5,502,715 A | 3/1996 | Penny |
| 5,548,813 A | 8/1996 | Charas et al. |
| 5,583,870 A | 12/1996 | Delprat et al. |
| 5,612,652 A | 3/1997 | Crosby |
| 5,625,877 A | 4/1997 | Dunn et al. |
| 5,630,212 A | 5/1997 | Ben-Efraim |
| 5,694,138 A | 12/1997 | Crosby |
| 6,049,561 A | * 4/2000 | Pezzlo et al. ................. 375/132 |
| 6,118,805 A | * 9/2000 | Bergstrom et al. ........... 375/132 |
| 6,118,824 A | * 9/2000 | Smith et al. .................. 375/259 |

OTHER PUBLICATIONS

MicroComm Digital Communication Products, http://www-.microcomm.co.nz/rfweb/, Dec. 5, 1997.
Welcome to WIMAN, http://www.wiman.net/welcome.shtml, Dec. 5, 1997.
Base Unit Systems, http://www.vshost.net/mt//systems/baseunits.html, Dec. 5, 1997.

* cited by examiner

Primary Examiner—Temesghen Ghebretinsae
(74) Attorney, Agent, or Firm—Brooks & Kushman P.C.

(57) ABSTRACT

A "software" radio in the form of a system is completely configurable and controllable in real-time by software and has a coordination capability to enable scaling to network aggregate data rates in the 10s of megabits per second per base station with no interference among the multiple radios. Base stations can, in turn, be time and frequency coordinated. Scalability is provided by the addition of substantially identical relay radios at each base station. A hybrid spread spectrum method and system of the invention include a protocol which facilitates coordinated frequency hopping. The system does not dwell more than a few milliseconds at any frequency center to achieve high scalability of the system in, for example, a metropolitan area. A single coaxial cable feeds control signals, electrical power signals and RF signals to a microwave antenna to reduce system hardware and installation costs.

5 Claims, 11 Drawing Sheets

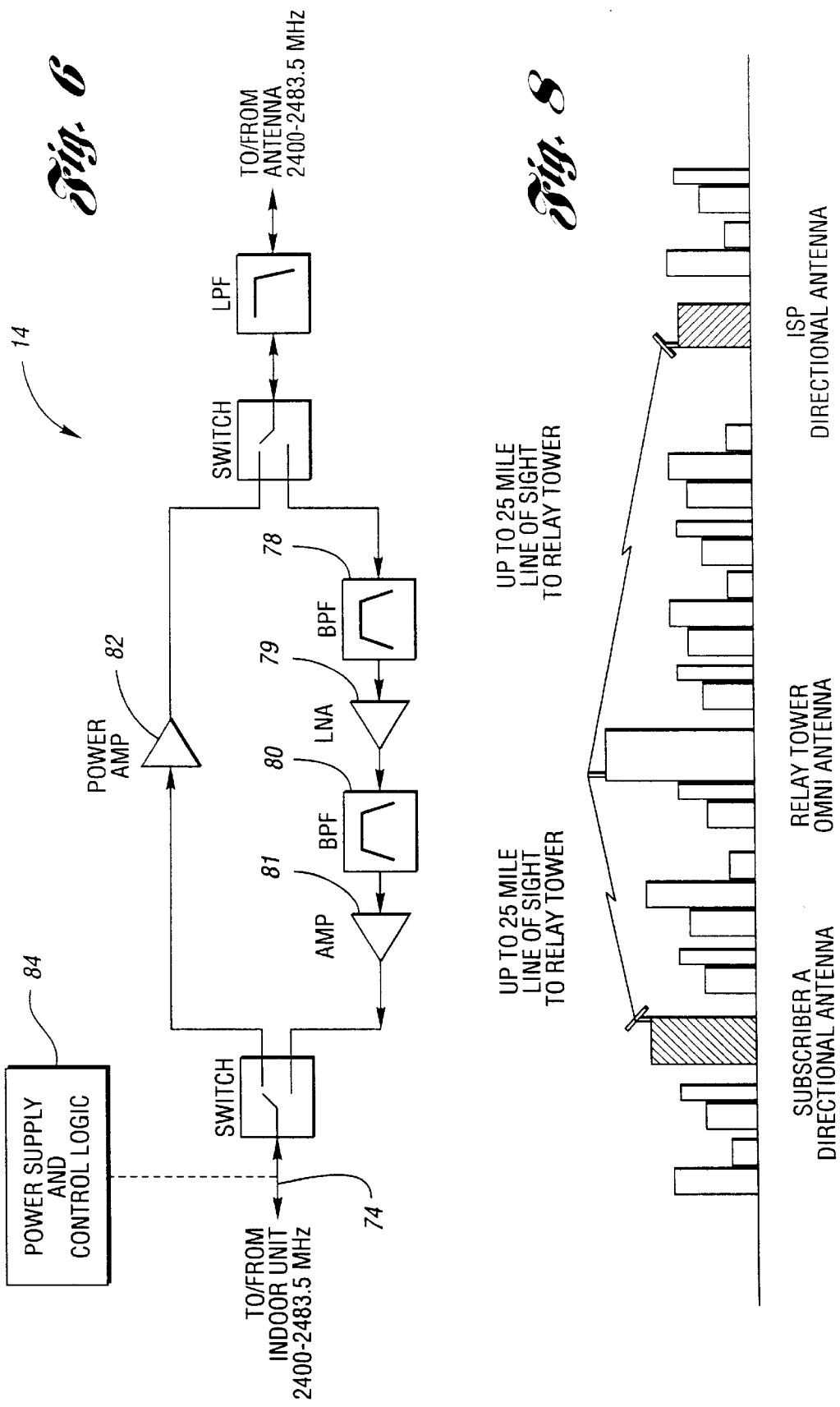

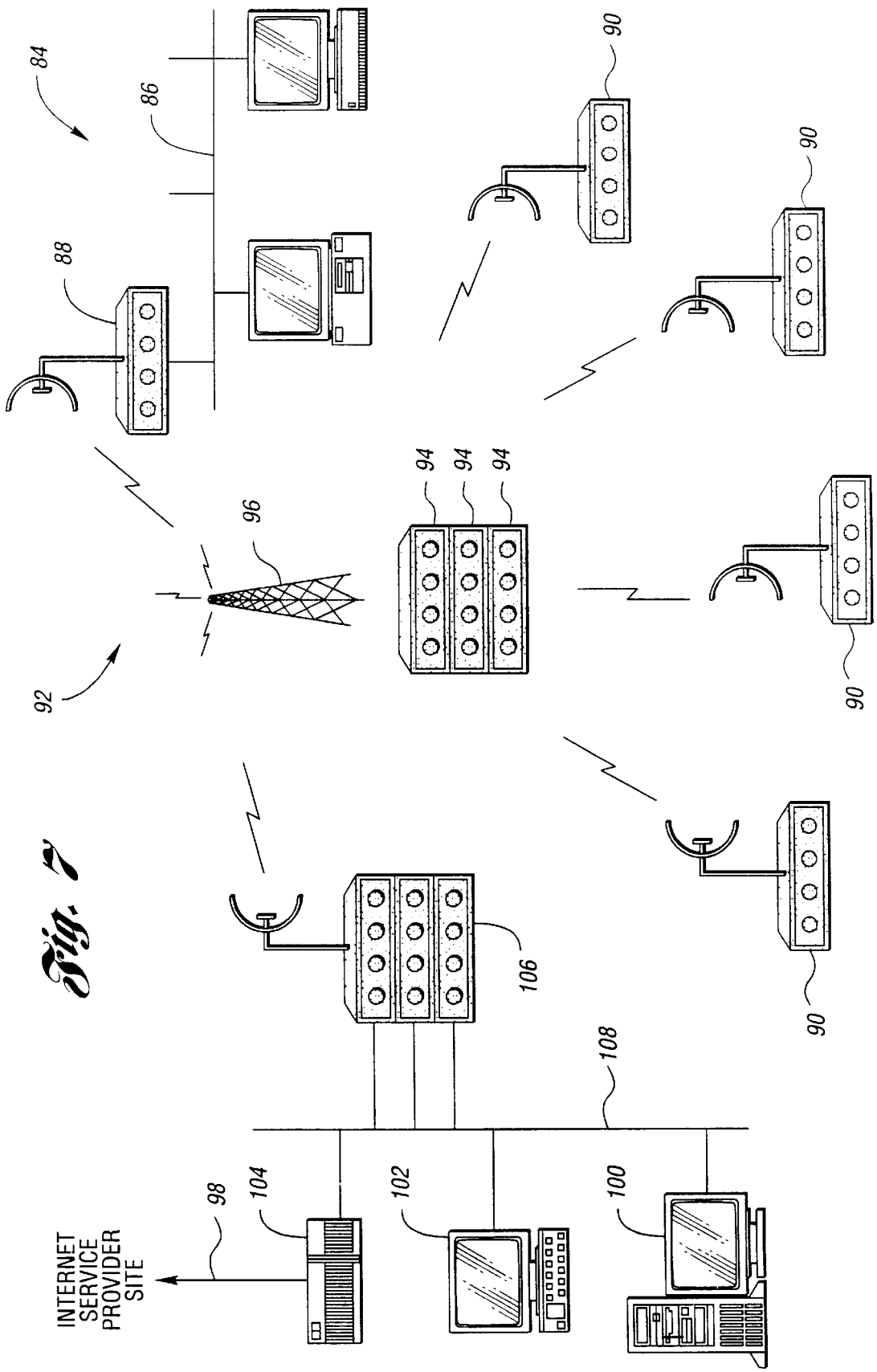

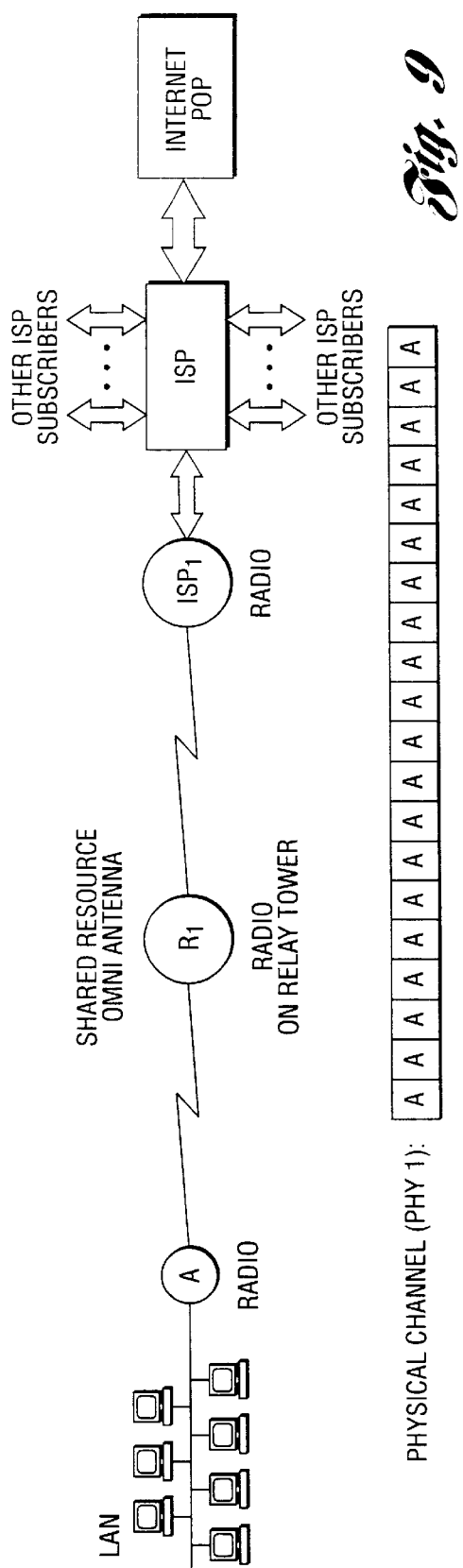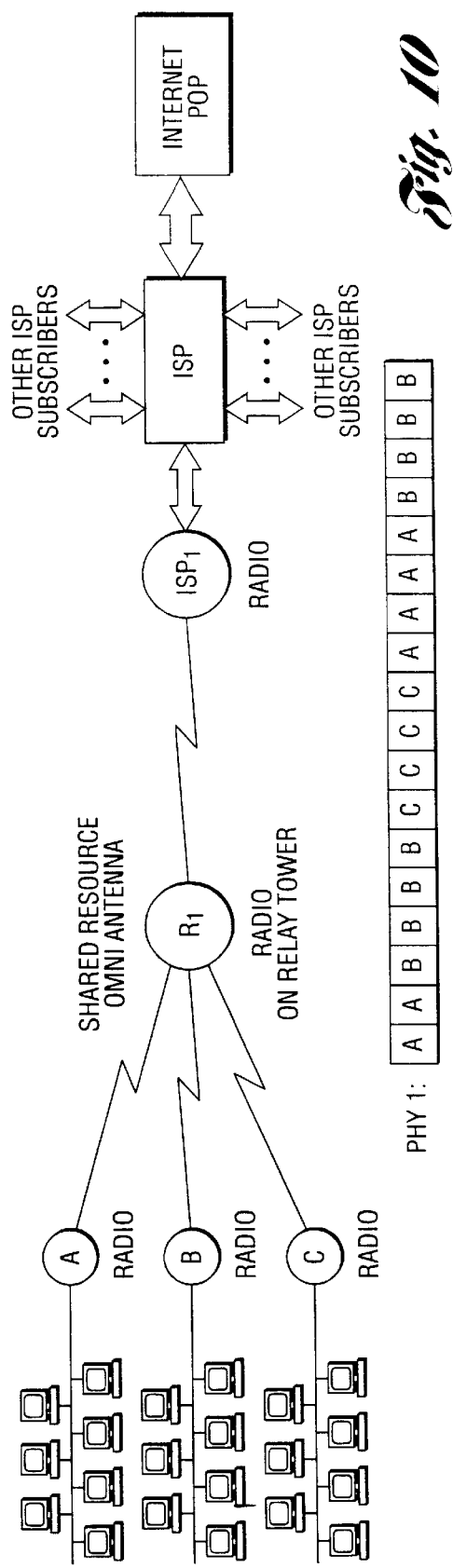

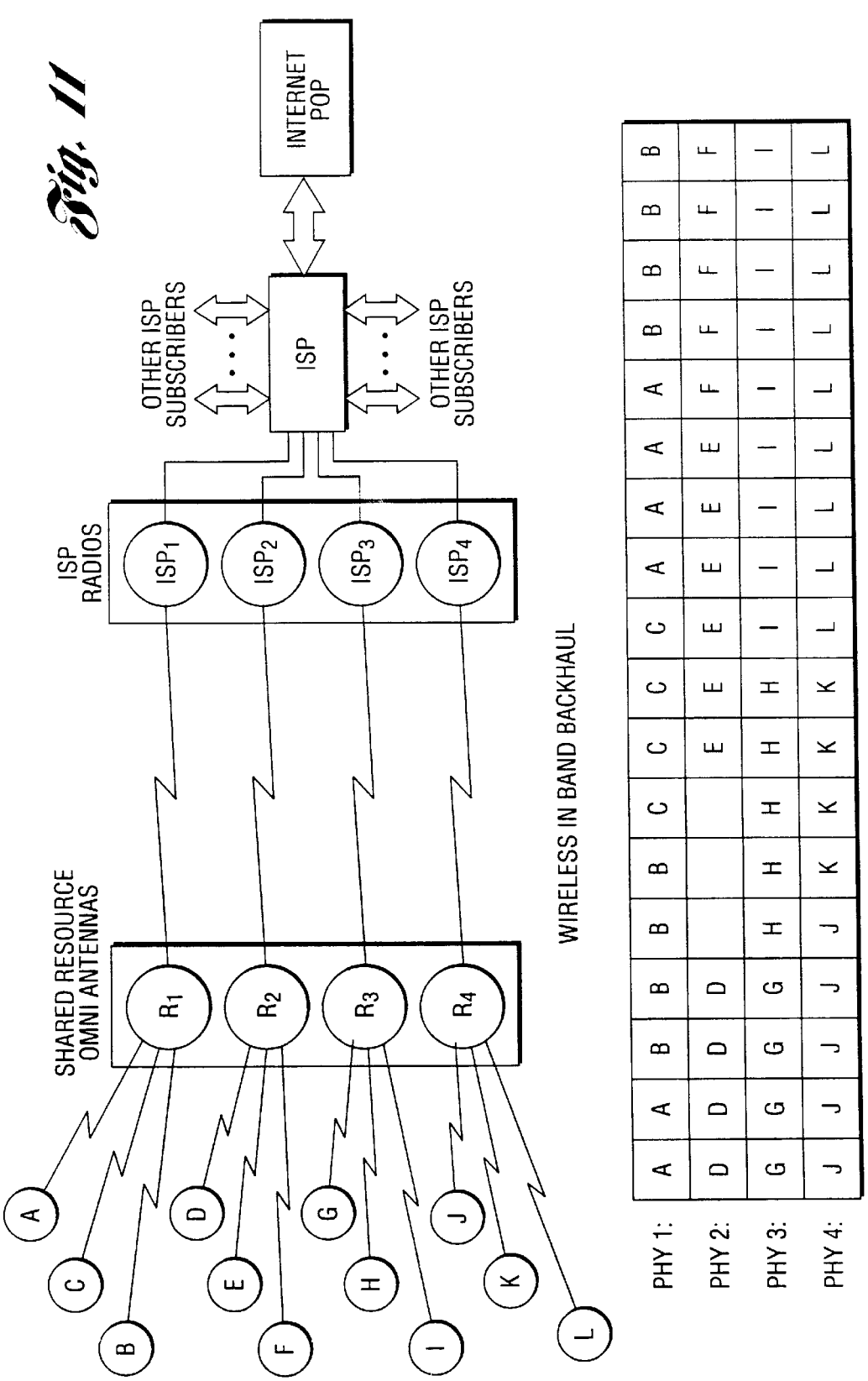

HYBRID SPREAD SPECTRUM METHOD AND SYSTEM FOR WIRELESSLY TRANSMITTING AND RECEIVING WIDEBAND DIGITAL DATA

TECHNICAL FIELD

This invention relates to hybrid spread spectrum methods and systems for wirelessly transmitting and receiving wideband digital data and, in particular, to spread spectrum methods and systems for wirelessly transmitting and receiving wideband digital data utilizing direct sequence and frequency hopping spectrum techniques.

BACKGROUND ART

Most interference, deliberate or accidental, affects communication because the information transmitted is condensed to a relatively small range of frequencies. An interference source active at the same frequency would produce signals that would mix with the actual communication channel to create errors. If, however, the information bearing signal is dispersed over a wider range of frequencies, the noise impulses can interference affect only a portion of the total information channel and can be filtered.

Spread spectrum technology increases the channel bandwidth of the signal to make it less vulnerable to interference. It refers to the transmission of a signal using a much wider bandwidth than would normally be required or to the use of narrow signals that are frequency-hopped through the various frequency segments available to the transponder. This approach is called spread spectrum multiple access (SSMA) or code-division multiple access (CDMA).

Spread spectrum technology was first adopted for military communication to prevent deliberate jamming or-interference resulting from battle conditions. CDMA operates in three modes: direct sequence, frequency hopping, and time hopping.

For commercial applications, spread spectrum technology permits the use of small-antennas (1.2 to 1.8 m in diameter). FCC regulations governing interference are related to power per unit bandwidth (power density). Either increasing the antenna size or the signal bandwidth would reduce the power density to acceptable levels. Rather than use a large antenna (which increases costs by a factor proportional to at least the square of the diameter), signal bandwidth is increased to reduce power density and, thus, interference.

With direct sequence spectrum-spreading, transmitted information is mixed with a coded signal that, to an outside listener, sounds like noise. In this alternative to frequency hopping, each bit of data is sent at several different frequencies simultaneously, with both the transmitter and receiver synchronized, of course, to the same coded sequence.

More recently, further advances in chip technology have produced digital signal processors that can crunch data at high speed, use little power and are relatively inexpensive. The improved hardware allows more sophisticated spread-spectrum techniques, including hybrid ones that leverage the best features of frequency hopping and direct sequence, as well as other ways to code data. The new methods are particularly resistant to jamming, noise and multipath—a frequency-dependent effect in which a signal reflects off buildings, the earth and different atmospheric layers, introducing delays in the transmission that can confuse the receiver.

The U.S. Pat. No. to Ben-Efrairn (5,630,212) provides for a microwave system with software configuration of operating parameters. Substantially all parameters in a radio are available and configurable using a network management system.

The U.S. Pat. No. to Monahan-Mitchell et al. (5,381,346) provides for a radio transceiver with a microcomputer which controls hardware dependent components. Software control of the microprocessor allows interaction with channel assignment, channel maintenance and other signaling.

The U.S. Pat. No. to Delprat et al. (5,583,870) provides for a cellular radio base station with software control of transceiver means.

The U.S. patent to Sandvos et al. (5,490,275) provides for a virtual radio interface and radio operating system for a communication device. A radio operating system is described which controls functioning of a radio through a MC68HC11 microcontroller.

The U.S. Pat. No. to Dunn et al. (5,625,877) provides for a wireless variable bandwidth air-link system. An apparatus which dynamically aggregates radio channels comprises a transceiver, microprocessor, and software.

The U.S. Pat. No. to Crosby (5,694,138) provides for a single coaxial cable which carries downlink signals from a satellite antenna and power signals to operate the antenna and an attached heating element.

The U.S. Pat. No. to Snow (4,115,778) provides for an electronic solid state FM dipole antenna. An amplified RF signal and DC power signal share a coaxial cable.

The U.S. Pat. No. to Mead (3,843,922) provides for a television preamplifier power source. The preamplifier is attached to an antenna mast and power is supplied through a coaxial cable which also transmits RF signals.

The U.S. Pat. No. to Dumbauld et al. (4,823,386) provides for a cable TV distribution system which uses a single coaxial cable to power subscriber frequency converters and carry video and control signals.

Other relevant U.S. patents include the U.S. Pat. Nos. 5,459,474 to Mattioli et al.; 5,548,813 to Charas et al.; 5,502,715 to Penny; and 5,612,652 to Crosby.

The non-patent literature entitled "Welcome to WIMAN", describes a wireless MAN that allows an ISP to offer wireless Internet access.

The non-patent literature entitled "Base Unit Systems", lists Mikro-Tik wireless ISP routers and systems.

The non-patent literature entitled "Microcomm Digital Communication Products", describes spread spectrum digital radio offerings and provides for an indoor/outdoor antenna unit to reduce cable loss. This literature appears on a web site.

SUMMARY OF THE INVENTION

An object of the present invention is to provide a hybrid spread spectrum method and system for wirelessly transmitting and receiving wideband digital data wherein channels can be quickly changed in a coordinated fashion so that multiple systems can be incorporated into networks without the fear of message collision between the different systems.

Another object of the present invention is to provide a hybrid spread spectrum method and system for wirelessly transmitting and receiving wideband digital data wherein the system includes an indoor unit and an outdoor unit with an antenna and wherein control, power and radio -frequency signals are combined in a single cable run between the indoor and outdoor units, thereby eliminating the need for wide temperature range circuits in the outdoor unit.

In carrying out the above objects and other objects of the present invention, a hybrid spread spectrum method for wirelessly transmitting wideband digital data is provided. The method includes the steps of formatting the digital data based on a predetermined protocol and dynamically allocating bandwidth to the formatted digital data based on a predetermined set of conditions. The method also includes the steps of coding the formatted digital data with a signal to obtain encoded digital data and transmitting the encoded digital data at a plurality of different frequency bands, each of which has a center frequency so that each bit of digital data is sent at each of the different frequency bands substantially simultaneously. The method further includes the step of dynamically changing the center frequencies in real-time in less than 100 milliseconds.

Preferably, a hybrid spread spectrum method is provided for receiving wideband digital data by reversing the steps of the above method.

Further in carrying out the above objects and other objects of the present invention, a hybrid spread spectrum system for wirelessly transmitting wideband digital data is provided. The system includes means for formatting the digital data based on a predetermined protocol to obtain formatted digital data, means for dynamically allocating bandwidth to the formatted digital data based on a predetermined set of conditions, means for coding the formatted digital data with a signal to obtain encoded digital data, means for transmitting the encoded digital data at a plurality of different frequence bands, each of which has a center frequency so that each bit of digital data is sent at each of the different frequencies substantially simultaneously, and means for dynamically changing the center frequencies in real-time in less than 100 milliseconds.

A hybrid spread spectrum system for wirelessly receiving wideband encoded and formatted digital data is also provided to carry out the above objects and other objects of the invention. The system includes means for decoding the encoded formatted digital data with a signal to obtain decoded formatted digital data, means for deformatting the decoded formatted digital data based on a predetermined protocol to obtain the digital data, means for dynamically deallocating bandwidth to the encoded formatted digital data based on a predetermined set of conditions, means for receiving the wideband encoded, formatted digital data at a plurality of different frequency bands, each of which has a center frequency so that each bit of digital data is received at each of the different frequency bands substantially simultaneously, and means for dynamically changing the center frequencies in real-time in less than 100 milliseconds.

Further in carrying out the above objects and other objects of the present invention, in a hybrid spread spectrum system including an indoor unit and an outdoor unit for wirelessly transmitting and receiving wideband digital data, a method is provided for transmitting power, control and RF signals between the indoor and outdoor units. The method includes the steps of coupling a single coaxial cable between the indoor unit and the outdoor unit, and transmitting the control, power and RF signals between the indoor unit and the outdoor unit over the single coaxial cable.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a schematic block diagram of the outdoor unit of FIG. 4;

FIG. 7 is a schematic diagram illustrating a configuration of subscriber sites, a central relay base station with three relay radio units, inband backhaul and an ISP site;

FIG. 8 is a schematic diagram of a simple network including units at a subscriber site, units at a central base station and units at an ISP;

FIG. 9 is a schematic diagram of a simple network with a single subscriber wherein all time slots are allocated to the single subscriber;

FIG. 10 is a schematic diagram of a simple network which can support several users from each of several subscribers on a single physical channel;

FIG. 11 is a schematic diagram of a more complicated network with three additional radios (i.e., systems) of the present invention at the base station and at the ISP;

BEST MODE FOR CARRYING OUT THE INVENTION

Figure 1:
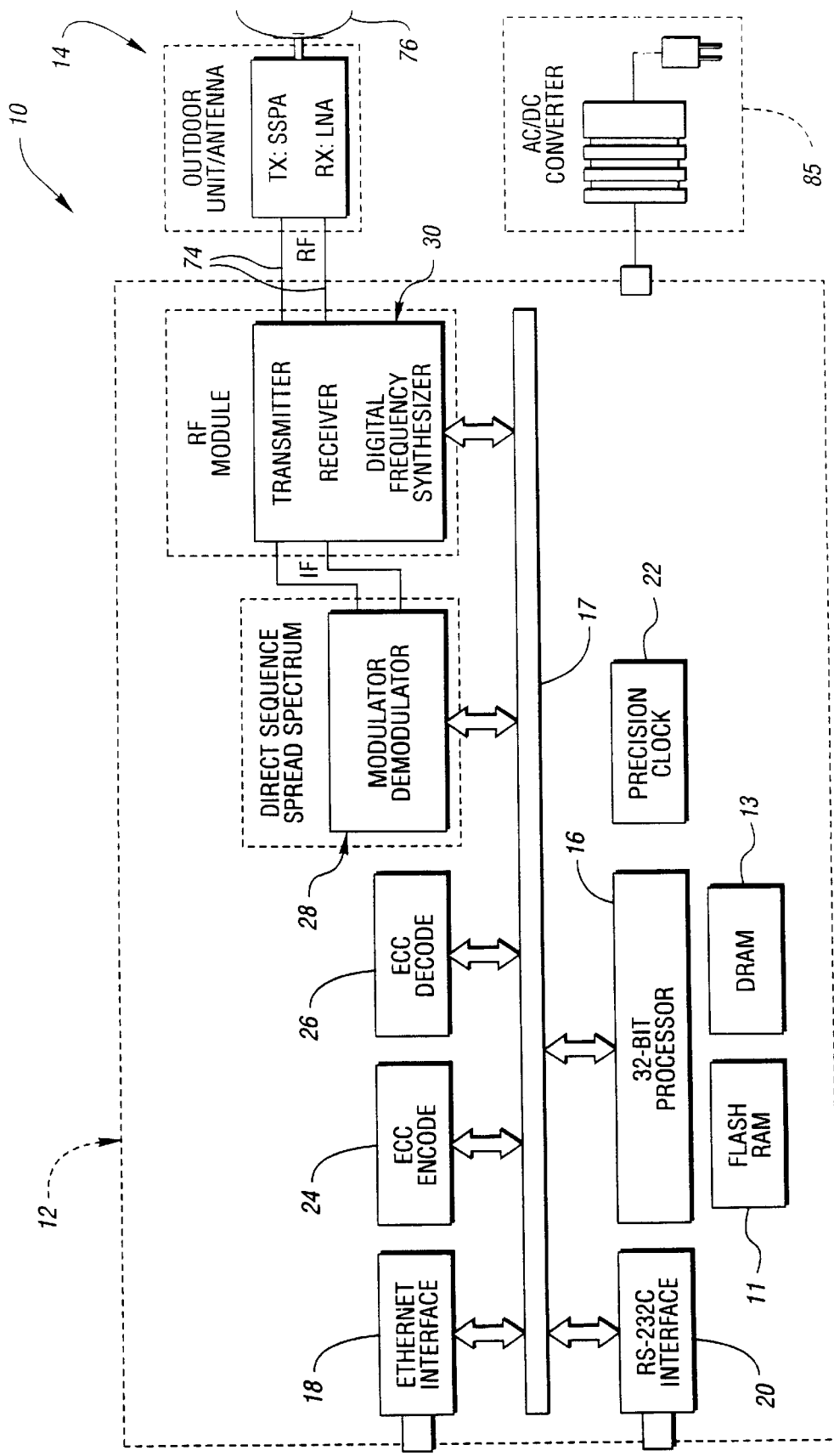
FIG. 1 is a schematic block diagram of a hybrid spread spectrum system for wirelessly transmitting and receiving wideband digital data and constructed in accordance with the present invention.

Referring now to the drawing Figures, there is illustrated in FIG. 1 a hybrid spread spectrum system or "software radio", generally indicated at 10, for wirelessly transmitting and receiving wideband digital data constructed in accordance with the present invention. The method and system 10 of the present invention are based on a frequency-tunable, direct sequence spread spectrum (DSSS) waveform. The method and system 10 use this frequency tunability for interference rejection. The direct sequence spread spectrum rejects multipath and some inband interference and encodes the wideband digital data.

The system 10 is a "software radio" in that the system 10 is completely configurable and controllable in real-time by software via a processor 16. Specifically, the bandwidth, modulation and frequency tuning and data bit rate are under software control, and may be changed in real-time.

Each system 10 transmits in the unlicensed Industrial, Scientific and Medical (ISM) radio frequency band from 2.4000 to 2.4835 GHz and 5.725 to 5.850 GHz under FCC Regulation Part 15.247. The method and system 10 are based on a frequency agile direct sequence spread spectrum waveform. The direct sequence spread spectrum rejects multipath and some inband interference. The frequency agility capability is an excellent interference rejection technique which acts to spread transmission opportunities over the entire ISM 2.4 GHz band. The system 10 does not dwell more than a few milliseconds on any frequency center. And, again, the direct sequence spectrum spreading is sufficient to enable coordinated frequency hopping under FCC regulations. This coordinated hopping is necessary to achieve high scalability of system capacity in a metropolitan area, as described in greater detail hereinbelow.

Bandwidth

The system 10 preferably has three data bandwidths available. Obviously, other bandwidths could be used. These are expressable as chip rates developed by a DSSS digital signal processor (DSP):

| Wide band | 45 MHZ/4 = 11.25 Mchips/second |
| Medium band | 45 MHZ/8 = 5.625 Mchips/second |
| Narrow band | 45 MHZ/10 = 4.5 Mchips/second |

Frequency Tuning

The system 10 has frequency centers assigned for the above bandwidths:

| Wide band | 2419.8750, 2431.1250, 2442.3750, 2453.6250 MHZ |
| Medium band | 2405.8125, 2411, 4375, 2417.0625, 2422.6875, 2428.3125, 2433.9375, 2439.5625, 2445.1875, 2450.8125, 2456.4375, 2462.0625, 2467.6875 MHZ |
| Narrow band | 2404.1250, 2408.6250, 2464.8750, 2469.3750 MHZ |

Modulation, Data Rate

The system data rate is determined by the selection of 11 chips per symbol for data symbols. This gives the system a processing gain greater than the 10 dB required by FCC Part 15 rules. DQPSK modulation is used to code each symbol into two bits as described herein below.

Therefore, the data rates available to the system 10 are 2.045 Mbps for Wideband, 1.023 Mbps for the Medium bandwidth and 818 Kbps for Narrowband.

Multiple access is not based- on CDMA, rather it is achieved by time division and is made efficient by the unique time/range tracking processing and dynamic bandwidth allocation as described hereinbelow.

Referring again to FIG. 1, the system 10 includes an indoor unit (IDU), generally indicated at 12, and a remote outdoor unit (ODU) with an antenna 76, generally indicated at 14. The IDU 12 is, in general, a computation capable radio, and the ruggedized ODU 14 is the final stage of RF power amplification as well as the first stage preamplifier in an RF receiver subsystem.

The IDU 12 includes a flash RAM 11 and a DRAM 13 which support a processor 16 which is a high speed communications engine capable of running standard TCP/IP and Ethernet protocol stacks as well as processing its node's role in the protocol described below. The processor 16 may be an Intel 960, 32 bit processor. Processing also includes precision timing, error control, and radio configuration/control. The processor 16 communicates with the other circuits of the IDU 12 by means of a system bus 17.

The IDU 12 also includes two standard interfaces: a 10base-T 10 MHZ 802.3 Ethernet interface 18 and RS-232C interface 20. A fast (100Base-T) Ethernet interface may also be included.

In general, the processor 16 deconstructs Ethernet packets, re-assembles and delivers the enclosed TCP/IP packets over the protocol and delivers TCP/IP packets to an ISP network.

The processor 16, together with a precision clock 22, establishes and maintains time synchronization within microseconds. This precision enables coordinated use of multiple radios or systems 10 to obtain scalable capacity with no interference with any other equipment in the network.

The IDU 12 also includes error correction encoding and decoding processing at blocks 24 and 26, respectively, to detect and correct data errors, both random noiselike and bursty interference. Most important, this coding guarantees that if a data block is declared "correct", it is, in fact, error free.

The IDU 12 further includes a direct sequence spread spectrum modulator and demodulator as indicated at block 28 and described in detail hereinbelow.

The IDU 12 still further includes an RF module coupled to the block 28 and having a transmitter circuit, a receiver circuit and a digital frequency synthesizer, all indicated at block 30 as described in detail hereinbelow.

In general, the protocol of the method and system of the present invention is optimized for minimum latency and scalable bandwidth sharing in a connectionless network. This protocol is a mix of contention opportunity slots, wideband data transfer and control slots and supports dynamic bandwidth allocation in a multipoint network. The protocol enables dynamic data bandwidth allocation by continuously measuring status of the multipoint subscriber LAN input queues, and traffic from the Internet destined for the network. Based on the nature of the packets in these queues, an optimum trade off of latency for payload rate is made and transmit slots are reallocated essentially continuously.

Strict time synchronization facilitated by the protocol enables reservation of certain slots for permanent virtual channels if required or for isosynchronous applications such as voice and video-conferencing. These virtual channels can be quickly released for general reuse when the application is completed.

Figure 2:
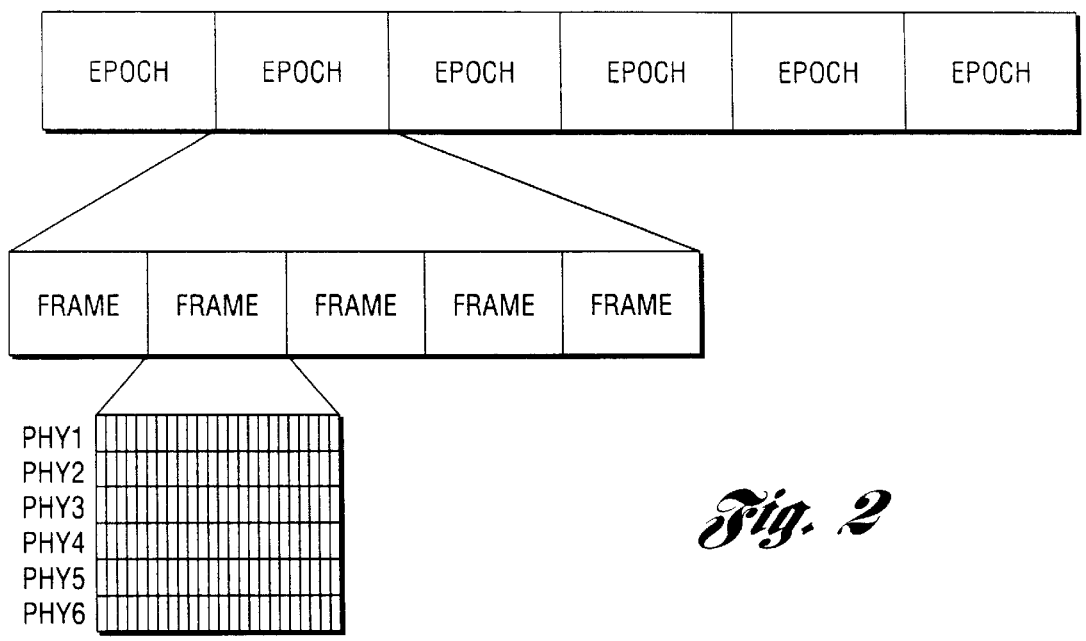
FIG. 2 is a block diagram illustrating epochs, frames and slots of the protocol of the present invention.

The computation capability of the hardware of FIG. 1 enables the implementation of the protocol. The protocol is optimized for minimum latency and scalable bandwidth sharing in a connectionless network. FIG. 2 illustrates three types of time intervals, Epochs, Frames and Slots, in the protocol.

In FIG. 2, Epochs provide structure for bandwidth allocations and represent the highest level of time interval. The Epoch structure is used to dynamically allocate bandwidth. Over one Epoch, status statistics are measured and user requests are gathered. The following Epoch is used to process these real-time parameters using the subscriber class of service as a guideline to optimally allocate the available bandwidth among those subscribers currently "on air". The next Epoch is used to communicate the allocation to the subscribers and relay units, and finally, in the next Epoch, the allocation is used. The duration of these Epochs are on the order of hundreds of milliseconds, so that bandwidth is dynamically reallocated in real-time over ones of seconds.

The allocation itself is represented by the time interval structure called Frames. All frames in an Epoch have the same format. Each Frame in an Epoch is identical, and all relay or subscriber units must "hear" the Frame structure as it is communicated to each Epoch or the software will preclude it from transmitting in the corresponding Epoch. Naturally, more than one transmission of this Frame structure representation is made to each Epoch to minimize the chances of it being missed. Only one reception of these structure representations is required of each Epoch to enable transmission. The Frame is an assigned mix of "slots": contention slots, wideband data transfer slots, and control slots. Assignments are made for each physical channel.

In the lower part of FIG. 2, columns represent time slots, frame descriptor blocks, pseudo random status messages, ACK/NAK/ELN and data-payload. Rows represent physical channels, one physical channel per relay radio. The time slots are on the order of ones of milliseconds and represent the point-to-point transfer of packets of data. Two kinds of slots alternate in time in the Frame: relays slots and subscriber slots. Relay units at a base station tower transmit in relay slots, subscriber units and ISP units transmit in subscriber slots. In the case of out-of-band backhaul, all ISP to relay communication is continuous full duplex.

Figure 3:
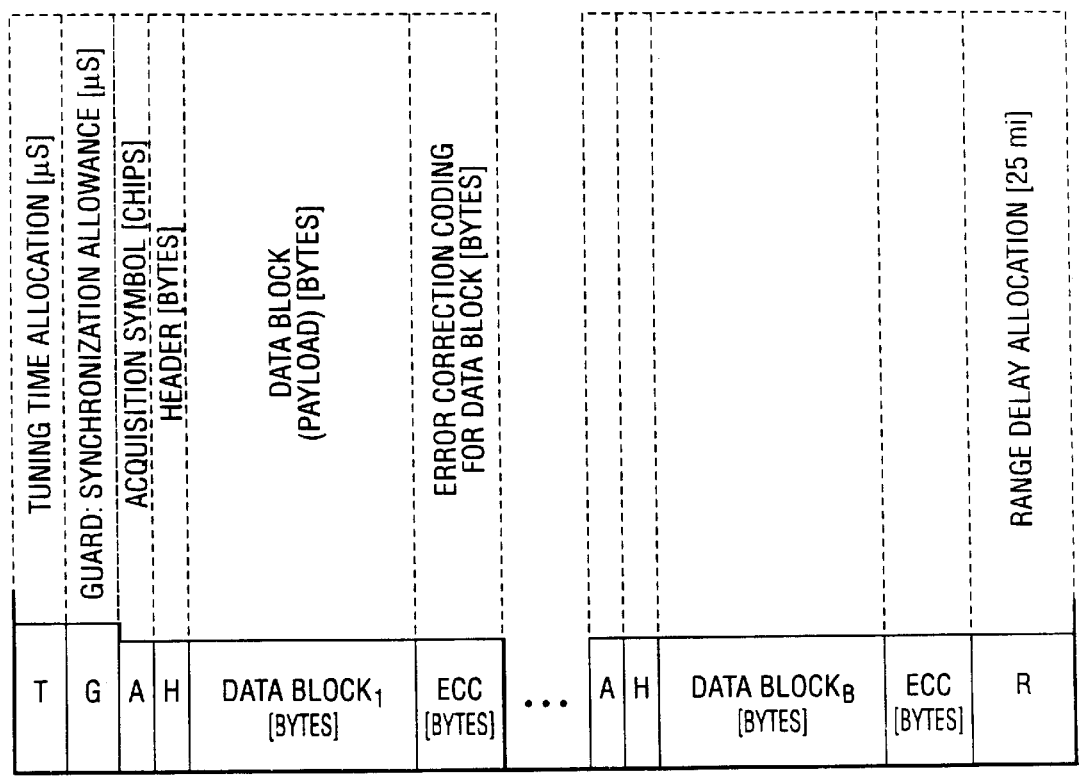
FIG. 3 is a block diagram illustrating the components of a time interval slot used to transmit/receive a packet of digital data.

FIG. 3 illustrates the components of the time slot interval which is used to transmit/receive a packet of data. Each packet consists of one or more (typical max is four) blocks of data:

| | |
|---|---|
| Tuning Time | Time to set frequency, spread spectrum codes, ECC parameters, etc. Typically 100 uS. |
| Guard | Allocation of time to allow for synchronization errors. This allocation is approximately 200 uS. |
| Acquisition Symbol | 64 chip Gold Code symbol used each data block in the packet. At 11.25 Mchips/second this takes 5.7 uS. Transmitted with DBPSK modulation. |
| Header Bytes and Data | 16 to 235 bytes of header ID, and data transmitted per data block, wherein B means blocks per slot. |
| ECC Bytes | Error correction and coded redundant bytes (0 to 20 bytes per block) for the detection and correction of byte errors in receive. |
| Range Delay | Allocation of 150 uS to allow for the speed of light over 25 miles. |

As a result of the rule for the relay unit not to transmit during subscriber slots, no unit transmits in more than half of the time slots. The worst case transmit duty cycle is at a relay unit (subscribers don't necessarily transmit in all subscriber slots).

Referring again to FIG. 1, once the data processor 16 has formatted the data into the above-described TDMA protocol, it is sent to the spread spectrum processor and modulator/demodulator module 28 after the encoding step described immediately below. In general, the spread spectrum processing is based on the Stanford Telecom STEL-2000A ASIC.

Figure 4:
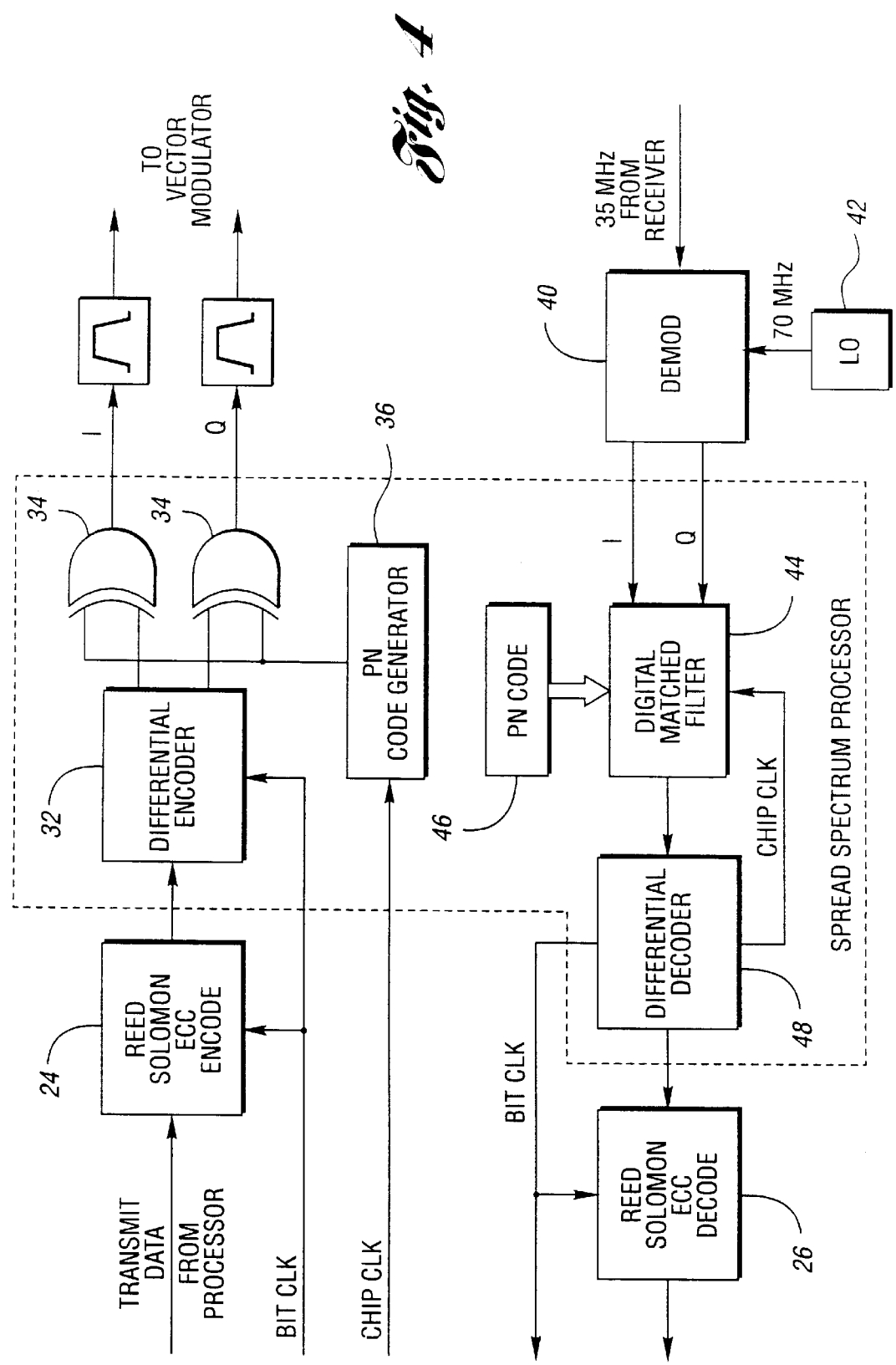
FIG. 4 is a schematic block diagram of the direct sequence spread spectrum processor and encode and decode circuits of FIG. 1.
Figure 5:
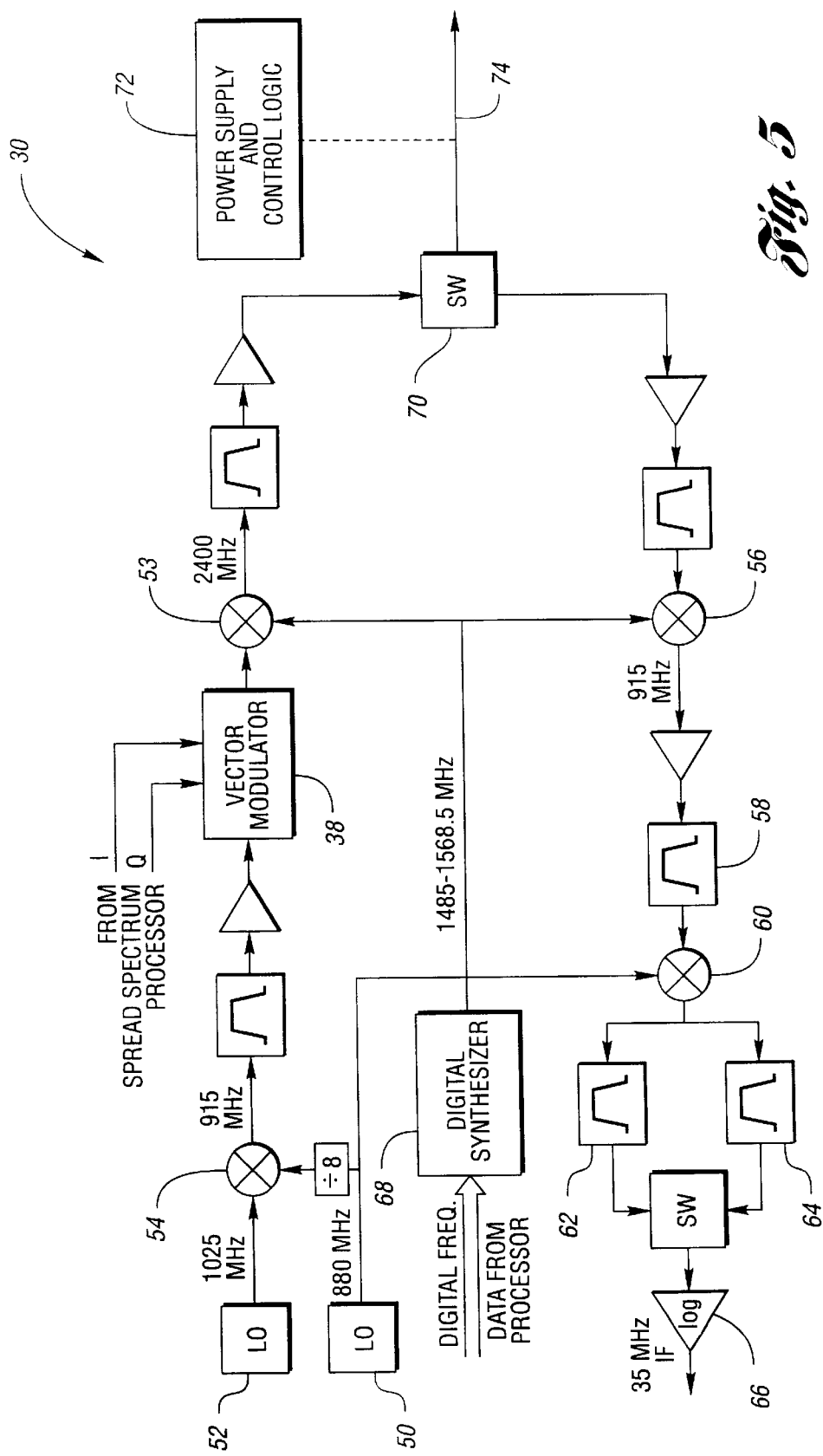
FIG. 5 is a schematic block diagram of the RF module of FIG. 1.

Referring now to FIG. 4, initially, Error Correction Coding (ECC) is applied to the transmit data at encode block 24 using the Reed-Solomon burst error correction algorithm. It is then differentially encoded at block 32 and spread at logic gates 34 with the Pseudo Noise (PN) codes (64 chips for acquisition symbols, 11 chips for data) generated at block 36 to create the I and Q signals to be applied to a transmit or vector modulator 38 as shown in FIG. 5. These I and Q signals represent a Differential Quadrature Phase Shift Key (DQPSK) signal.

On the receive side, the 35 MHZ received IF is first demodulated at block 40 into the baseband I and Q signals by a quadrature demodulator with a 70 MHZ Local Oscillator (LO) 42. The I and Q signals are each digitized by a high speed A/D converter (not shown) and applied to a digital tap delay line matched filter 44. This filter 44 correlates the received signal with the appropriate PN code from block 46 and de-spreads the signal back into differential dibit symbols. Subsequent digital circuitry 48 recovers the bit clock and converts symbols into data bits. These bits are processed by the Reed-Solomon ECC circuitry 26 which determines the syndrome information to both correct and detect bit errors.

The next stage in the IDU 12 is the RF module 30. Still part of the Indoor Unit (IDU) 12, in general, this module 30 contains a receiver, a transmitter and digitally synthesized LOs. It is designed for half duplex operation.

Referring now to FIG. 5, the transmitter portion of the module 30 operates by modulating at the block 38 a 915 MHZ signal with the I and Q signals from the spread spectrum processor and upconverting to 2.4 GHz at a mixer 53. The 915 MHZ signal is synthesized by mixing a 1025 MHZ signal of a LO 52 and a 110 MHZ signal of a LO 50 together at a mixer 54. This is done so there is no 915 MHZ LO running when in the receive mode that could interfere or quiet the receiver portion of the module 30.

The receiver portion of the module 30 down converts a received 2.4 GHz signal to 915 MHZ at a mixer 56, filters at block 58, then down converts to 35 MHZ by mixing with the 880 MHZ signal from the LO at block 60. The IF stage is dual bandwidth, as indicated at blocks 62 and 64, 7 MHZ wide for the 5.625 and 4.5 Mchip/second channels and 15 MHZ wide for the 11.25

Mchip/second channels. The final stages of the IF amplifier is a log amp 66 to yield high dynamic range.

The up and down conversion between 915 and 2.4 GHz is made with a digital synthesizer 1500 MHZ LO 68. This LO 68 can tune across the ISM band in 100 s of microseconds, giving the system 10 its frequency agility.

The RF transmit and receive signals are coupled together with a switch 70 to yield the half duplex operation. The RF signal is combined with a DC voltage and a control signal which signals are sent over a coaxial cable 74 to power and control the outdoor unit 14, as indicated at block 72.

Referring now to FIG. 6, the ODU 14 comprises a transmit/receive (T/R) module. The ODU 16 has two benefits, it enables long range wideband communications and it enables easy installation at all ISP, relay base station and user sites. The ODU 16 is mounted to the back of an antenna 76 (FIG. 1) and includes the receiver front end at blocks 78, 79, 80 and 81 and the final stage of transmit power amplification at block 82.

The ODU 14 makes long RF path lengths possible in the ISM frequency bands by maximizing the radiated ERP and minimizing the system-noise figure. The unique design feature including the control signals and power in the coaxial cable 74 as extracted by block 84 also reduces the system hardware and installation costs.

In order for the communications system 10 to achieve long radiated path lengths, the transmit power must be maximized and the receiver noise figure must be minimized. Since the transmit power in the ISM bands is limited, the system noise figure must be minimized. In addition, it is important that the transmitter output power use a leveling loop to be as close to the maximum allowed EiRP as possible.

The absorptive loss of the cable which runs between the antenna 76 and the receiver front end can have a significant effect on the transmit EiRP and the system noise figure. All cable has an absorptive loss per unit length. This loss must be carefully controlled to assure maximum radiated path length. Many systems account for the cable loss by using low-loss cable as the cable runs get long. The low-loss cable is significantly more expensive than the standard cable 74. The ODU 14 eliminates the need for expensive, low-loss cable by placing the transmitter and receiver front end after/before the cable run.

The ODU 14 also allows the receiver/transmitter 30 in the indoor unit 12 to be placed in an environmentally controlled location. This reduces the cost of the receiver/transmitter unit by eliminating the need for wide temperature range circuits which include industrial temperature range components.

It is necessary to send power and control signals to the antenna 76 along with the RF signal. The ODU design is unique because all power and control signals, as well as the RF signal are transmitted to the ODU 14 and antenna 76 using the single coaxial conductor 74. It is not necessary to make a separate cable run for the power and control signals.

The T/R module 14 is preferably permanently attached to the antenna 76. Its output is set at the factory to the maximum allowable EiRP.

Installation

Since system 10 does not require any licenses, nor is there any telco involvement for laying dedicated lines or configuring ISDN ports, it is perfect for temporary, special event, portable or emergency installations.

FIG. 7 illustrates a configuration of: a typical subscribers' site, generally indicated at 84, including a LAN 86 with a subscriber unit 88, and other units 90; a central relay site or base station, generally indicated at 92, with three relay radio units or transceivers 94 and a radio hub 96; inband backhaul 98; and an ISP site having an ISP server 100, a network manager 102, a router 104 and transceivers 106 connected on an ethernet 108.

The system 10, as previously mentioned, involves two units, the indoor unit 12 and the outdoor unit 14, for each radio at each site (subscriber, relay, and ISP):

Indoor Unit 12

Referring again to FIG. 1, the indoor unit 12 typically has three connections:

Power:

120V, 60 Hz AC power into a power adapter unit or converter 85.

LAN Connection:

RJ-45 10Base-T interface 18 into the indoor unit 12

CPE—serves as the IP router connection point for routing N IP addresses over the wireless network.

Relay units in base station do not use this connection unless out of band backhaul is used.

ISP facility—Ethernet connection of N (the number of radios at the central relay base station to the ISP router.

Event In/Out—Timing using GPS time synch pulses (PPS) or self-generated pulses.

RF Connection to Outdoor Unit:

Outdoor Unit 14

The outdoor unit 14 (T/R module and antenna 76) installation is simplified by the ability to remote it from the indoor unit 12 by several hundred feet to the top of the building of its side, if necessary. Power, signal and control all flow through the single thin coax cable 74. As a result, no separate (or outdoor) source for power for this unit need be found. For very remote outdoor unit installation, thicker coax may be used.

Antenna pointing at the subscriber and ISP site is facilitated by embedded software which helps find the optimum pointing angle quickly. Antennas at the central base station relay tower are omnidirectional and need not be "pointed".

Network Management/Security

Relay and subscriber units are IP addressable and SNMP manageable. The system 10 is fully compliant with SNMPv2 and has registered custom MIB. The SNMP operates with any SNMP workstation such as Sun, HP, IBM or AT&T.

The windows based network manager supports the following capabilities:

Remote configuration;

Remote monitoring of status and faults, triggering diagnostics and alarms together with the appropriate personnel paging;

Accounting—bytes, packets delivered; and

Passing security parameters.

As previously mentioned, the protocol involves code diversity, direct sequence spread spectrum and frequency agility, changing frequency in ones of milliseconds and its configuration completely each Epoch (ones of seconds). As a result, eavesdropping requires InterAir unit hardware and a significant work factor to hack the software in order to "read" a subscribers' packets. Theft of services is made extremely difficult by the cooperative synchronization process which exactly identifies the subscriber hardware, checks with current account data for validity and even measures range to the subscriber site. Anomalies in any of these safeguards precludes assignment of virtual channels to transmit TCP/IP data.

Metropolitan Area Network

The system 10 has been designed to operate with a high (20 dB) fade margin at long range (up to 25 miles) in order to cover a large (2,000 square mile) metropolitan area in this unlicensed radio environment from a single base station.

The number of systems 10 in a network is scalable. An ISP can start up with an individual radio (i.e., system 10) at a central base station and add additional radios at this base station site as required by subscriber demand, up to a network aggregate data rate of 10 s of megabits per second. Furthermore, base stations can be time and frequency coordinated in a cellular topology to provide network aggregate data rates in the 100 s of megabits per second in a metropolitan area.

Network Topologies

A network consists of units or systems at the subscriber site, units at the central base station, and units at the ISP. The simplest case is shown in FIG. 8.

In FIG. 8 and the following FIGS. 9–12 described below, a subscriber unit at location A supports several users doing TCP/IP applications. TCP/IP packets are delivered to the subscriber unit over an Ethernet, where they are packaged into time slots and transmitted to the relay unit. There is no restriction on packet size, and all TCP/IP packets are reassembled in the network before transmission to the ISP network.

The packets are relayed from the central base station to the ISP completing the wireless connection. Since, in this case, there is only one subscriber, A, all time slots can be allocated to A, as shown in FIG. 9, whether A's users have data to send/receive or not. The single row of time cells or slots represents the capacity of one radio at the base station—one physical channel.

In fact, base station radios can support several users from each of several subscribers on a single physical channel. In FIG. 10, one radio at the central base station has dynamically divided its physical channel into "virtual channels" for subscribers A, B and C based on real-time usage. The processing required for this real-time bandwidth allocation is performed by the computation capable network. The scalability is continued by addition of identical relay radios (i.e., system 10) at the base station.

In FIG. 11, three radio pairs have been added; three additional radios at the base station and three additional radios at the ISP. The network thereby obtained three more physical channels which are represented as rows in the time division matrix, one row for each radio pair. The multiple subscribers may be re-assigned as needed by the bandwidth allocation processing since the relay antennas at the base station are omni directional. With four radios at the base station and "inband" backhaul (i.e., a radio link back to the ISP), the systems can deliver a half duplex network aggregate data rate of 4 Mbps. As a point of reference, an ISDN BRI channel is 128 Kbps half duplex and is connection oriented—not "shareable" as last mile connectivity.

Fully populated with eight omni antennas, a single base station can support 6 Mbps half duplex network aggregate data rate.

As previously mentioned, the radios or systems 10 are computation capable and process both the standard TCP/IP and Ethernet protocol stacks as well as InterAir proprietary protocol stack optimized for multi-subscriber/multi-channel use in an interference medium. This protocol provides very fine time synchronization and coordinated frequency hopping so that no data is lost to collision. All bandwidth is dynamically allocated by this protocol although any or all slots may be reserved as required by the ISP or by future interaction with Internet reservation protocols.

The next step in the scalability of network capacity is to replace the "inband" backhaul with a direct dedicated connection (leased line or microwave link) from the centralized base station back to the ISP network connection.

Figure 12:
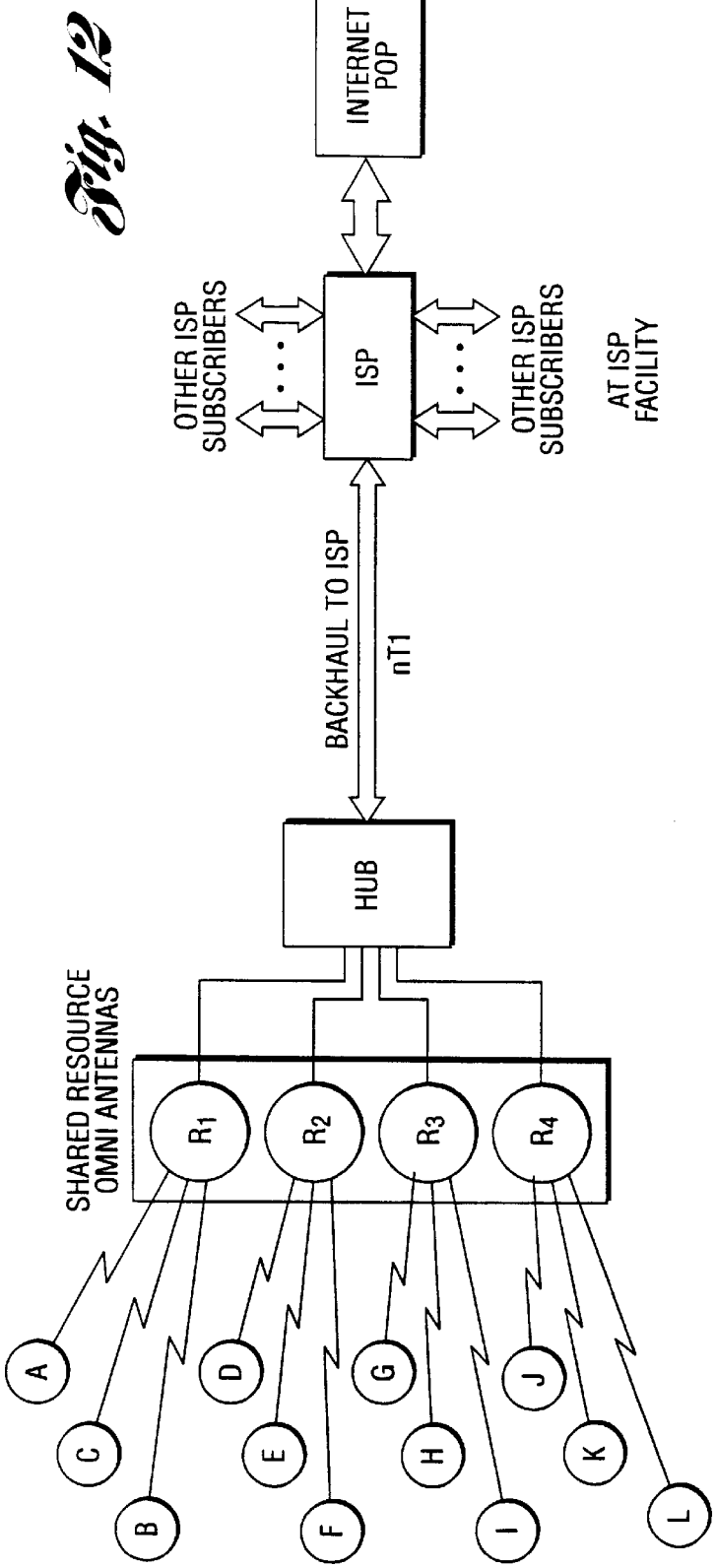
FIG. 12 is a schematic diagram of a network wherein backhaul is accomplished by N T1 lines.

In FIG. 12, the backhaul is accomplished by N T1 lines where N is the number required to support the network capacity. The time division slots are single hop—half as long to deliver the same number of data bytes—which immediately doubles the network aggregate data rate of this base station to a maximum of 12 Mbps half duplex or approximately 93 ISDN equivalents, network engineered for maximum data rate and reuse as dedicated by the ISP.

Again, because the radios 10 meet the FCC regulations for coordinated use, a single base station can be scaled even further using directional antennas at this central site to develop a "sector" topology.

Figure 13:
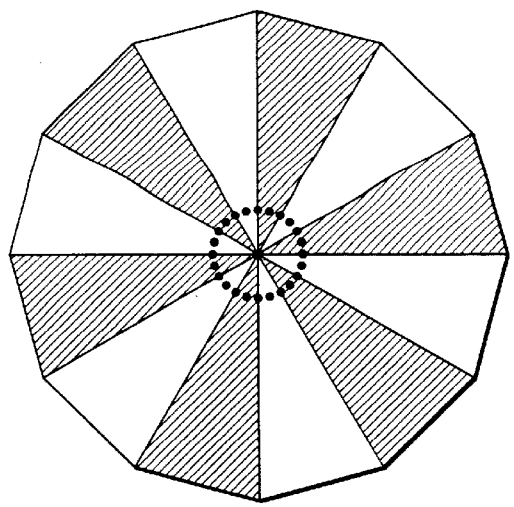
FIG. 13 is a schematic diagram of a base station which supports 12 sectors each of which has two radios or systems of the present invention.
Figure 16:
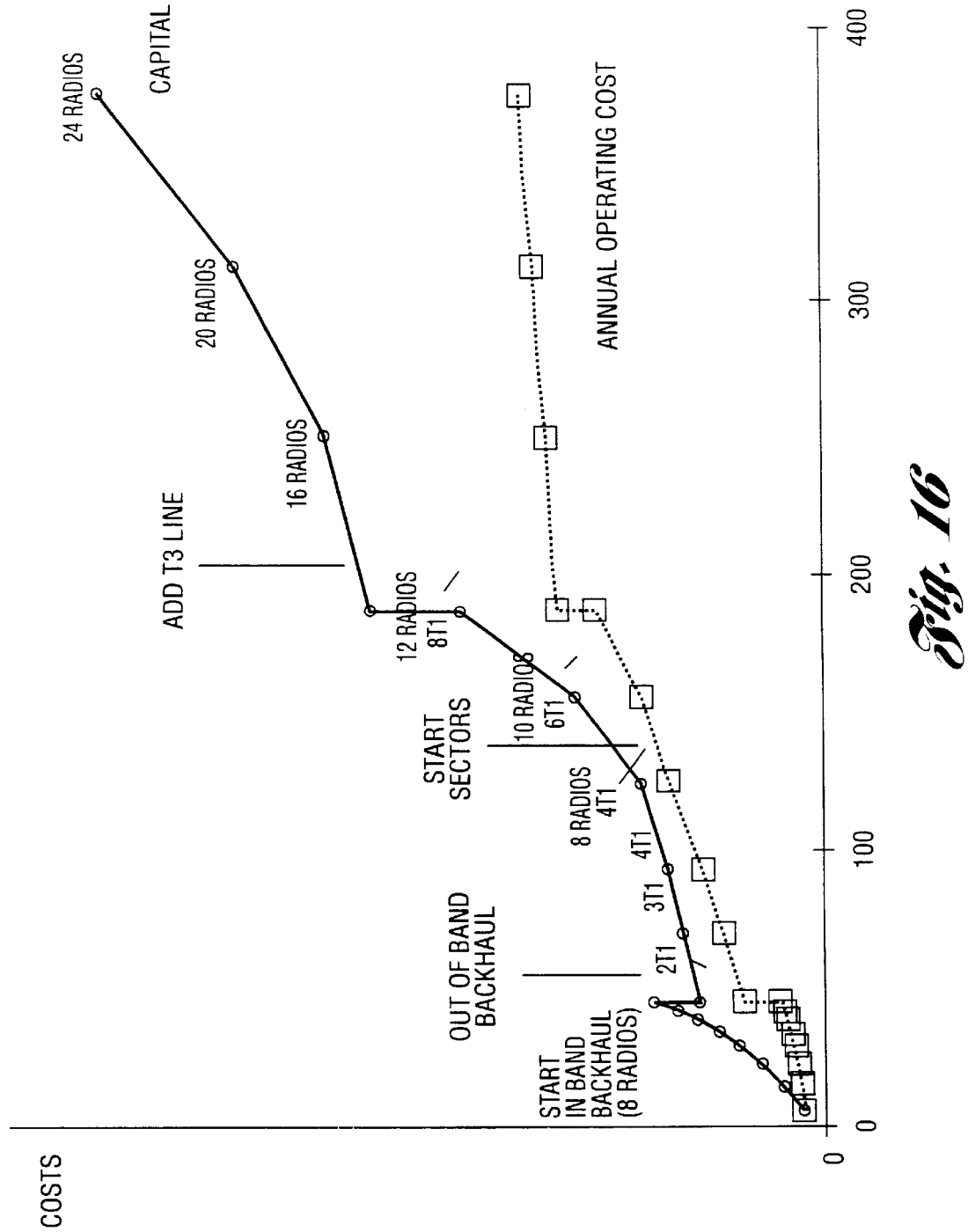
FIG. 16 is a graph of cost versus system capacity which illustrates four distinct phases of capacity growth based on one central relay base station.

In FIG. 13, the example base station supports 12 sectors, each with two radios for a 25 mile range. The radios have directional antennas and service only those subscribers in the sector. There is no requirement to build out all sectors. If some sections cover an area with no subscribers, no radios need to be installed for those sectors. Out of band backhaul is required in this topology and the maximum network aggregate data rate obtainable from a single base station is 48 Mbps half duplex. The cross-hatched sectors are 2 Mbps: A, C; 1 Mbps: e,g. The white sectors are 2 Mbps: B, D; 1 Mbps: f,h. FIG. 16, as described hereinbelow, provides an example of the capacity/cost scalability for a single base station.

Figure 14:
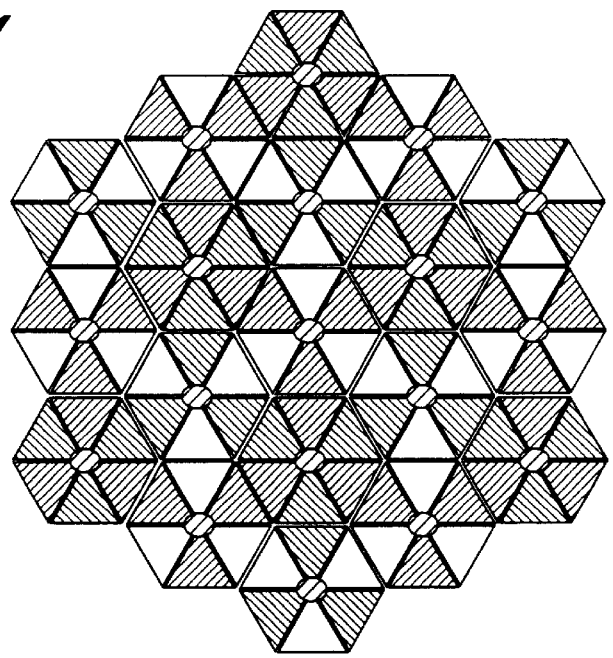
FIG. 14 is a schematic diagram illustrating a coordinated network of cellular base stations.

Ultimately, an entire metropolitan area may be covered with a coordinated (tiled) network of cellular base stations, as FIG. 14 illustrates.

In the cellular base station case of FIG. 14, there are 6 sectors per cell each sector with two radios (one at 2 Mbps and one at 1 Mbps). Again, directional antennas are used at the base station, and out-of-band backhaul is required. The network aggregate data rate for each of these cellular base stations is 18 Mbps. All transmissions are coordinated in time and frequency. The same sectors represent identical frequency pairs. The cells can be any size from one mile up to a 25 mile radius, making it possible to extend coverage to fit a variety of market densities and topographies.

Figure 15:
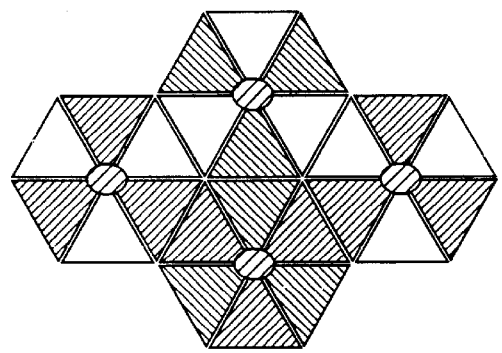
FIG. 15 is a schematic diagram of a cellular topology wherein a subscriber may use a "surrounding" base station.

FIG. 15 illustrates the capability to provide spatial diversity through a cellular topology. In this topology, a subscriber may use whichever "surrounding" base station that provides the easiest access. This is particularly valuable in a metropolitan business district (urban canyon) setting in which gaining rooftop access is a potential impediment to quick installations. Spatial diversity may afford the end user access to the network through a window mounted antenna. A subscriber may have a better RF path or easier installation if a more distant relay is used.

Cost/Capacity Scalabiliy

System capacity scales up directly with cost incurred. An ISP can start with a very low cost infrastructure with a single central relay base station. Increased capability can be easily and quickly added as required.

FIG. 16 illustrates four distinct phases of capacity growth based on one central relay base station:

Inband backhaul: In this phase, the ISP starts with 1 radio on the central relay base station and grows to 8 radios and a capacity of approximately 40 ISDN equivalents (simultaneous full 128 Kbps half duplex).

Out-of-band backhaul: Adding out-of-band backhaul immediately doubles the network capacity. In this phase, one adds backhaul capacity to get from 40 to 120 ISDN equivalents.

Start Sectoring: In this phase, the antennas are changed to directional sector antennas. At 12 radios, it makes economic sense to change to T3 class backhaul. This represents a capacity of approximately 190 ISDN equivalents.

Add T3 class backhaul: Adding radios up to a total of 24 obtains a final single base station capacity of 400 ISDN equivalents.

For capacity beyond 400 ISDN equivalents, the system scales to a cellular configuration, in which each cell has approximately 180 ISDN equivalents and covers an area from 25 square miles (3 mile radius) to over 1,900 square miles.

The system 10 is typically an Internet Service Provider (ISP) owned (zero telco involvement) last mile connectivity infrastructure for up to several hundred wideband service subscribers in a large metropolitan area.

The system 10 enables the ISP to offer wideband services: Internet applications including e-mail, web browser/server, file transfer, voice, fax, videoconferencing over IP, advanced ISP value add applications including push, multicasting . . . , limited only by imagination.

The system extends the concept of ISP back office (modem, bandwidth, . . .) resource reselling to the last mile subscriber connectivity resource.

The system is also affordable: very low initial investment. The network can be built out as needed, and the system 10 is easy to install, operate and maintain. It can also provide a completely independent back-up to a subscriber-with a landline based connection.

In summary, the system 10 provides for a wireless, wideband, metropolitan area network for facility based connection to subscribers, wholly owned by Internet Service Provides (ISP).

No-license is required by the ISP before use of the equipment in any metropolitan area in the U.S. and Canada. The 2.4 GHz ISM band is available worldwide.

The equipment and cables are shielded to resist interference from indoor wireless LANs and microwave ovens. Military strength anti-interference and anti-intercepting technology is preferably built in to ensure reliable, secure digital connections.

Also, the system 10 offers high signal rates (1 and 2-Mbps) and has been designed to FCC spread spectrum regulations to legitimately coordinate radios. This coordination capability enables scaling to network aggregate data rates in the 10 s of megabits per second per base station.

While the best mode for carrying out the invention has been described in detail, those familiar with the art to which this invention relates will recognize various alternative designs and embodiments for practicing the invention as defined by the following claims.

What is claimed is:

1. A hybrid spread spectrum method for wirelessly transmitting wideband digital, the method comprising the steps of:

formatting the digital data based on a predetermined protocol;

dynamically allocating bandwidth to the formatted digital data based on a predetermined set of conditions;

coding the formatted digital data with a signal to obtain encoded digital data;

transmitting the encoded digital data at a plurality of different frequency bands, each of which has a center frequency so that each bit of digital data is sent at each of the different frequency bands substantially simultaneously; and dynamically changing the center frequencies in real-time in less than 100 milliseconds.

2. The method of claim 1 wherein the step of dynamically changing is performed in less than 10 milliseconds.

3. A hybrid spread spectrum method for receiving wideband digital data by reversing the steps of the method of claim 1.

4. A hybrid spread spectrum system for wirelessly transmitting wideband digital data, the system comprising:

means for formatting the digital data based on a predetermined protocol to obtain formatted digital data;

means-for dynamically allocating bandwidth to the formatted digital data based on a predetermined set of conditions;

means for coding the formatted digital data with a signal to obtain encoded digital data;

means for transmitting the encoded digital data at a plurality of different frequence bands, each of which has a center frequency so that each bit of digital data is sent at each of the different frequencies substantially simultaneously; and means for dynamically changing the center frequencies in real-time in less than 100 milliseconds.

5. The system as claimed in claim 4 wherein the means for dynamically changing changes the center frequencies in less than 10 milliseconds.

* * * * *